Figure 1:
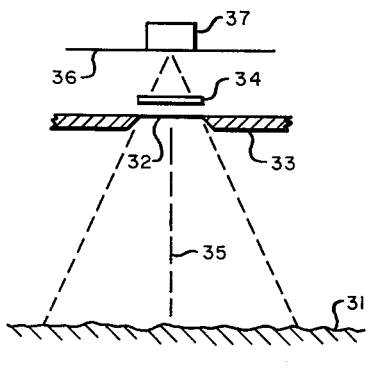

Feb. 15, 1966 G. STAVIS 3,234,845
APPARATUS FOR OPTICALLY CORRELATING THE ALIGNMENT
OF A TRANSPARENCY AND AN OBJECT
Filed April 22, 1963 5 Sheets-Sheet 1

INVENTOR.
GUS STAVIS

BY *H. S. Mackey*

ATTORNEY.

INVENTOR.
GUS STAVIS

BY

ATTORNEY.

Feb. 15, 1966  G. STAVIS  3,234,845
APPARATUS FOR OPTICALLY CORRELATING THE ALIGNMENT
OF A TRANSPARENCY AND AN OBJECT
Filed April 22, 1963  5 Sheets-Sheet 3

INVENTOR.
GUS STAVIS
BY H.S. Mackey
ATTORNEY.

INVENTOR.
GUS STAVIS

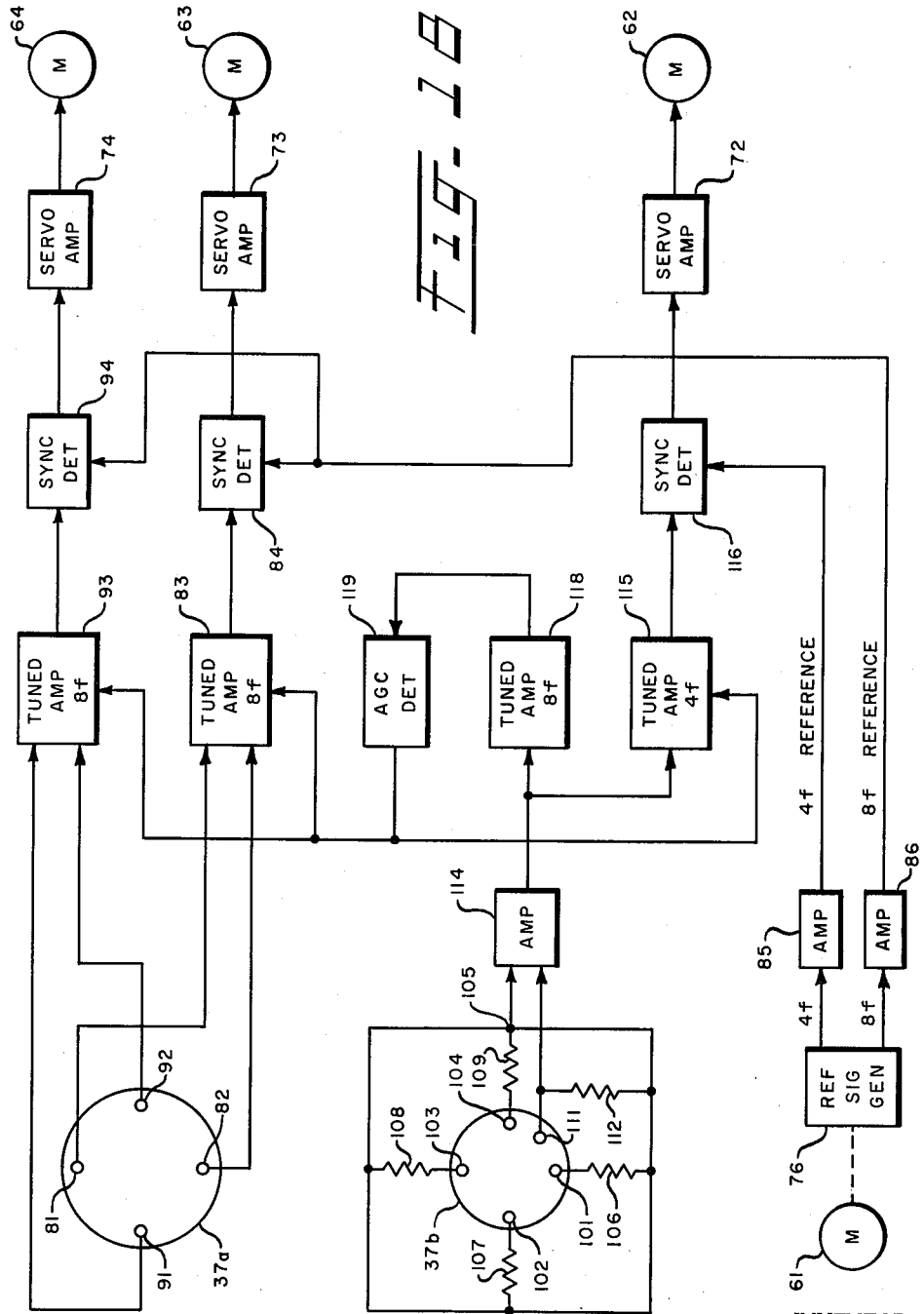

United States Patent Office 3,234,845
Patented Feb. 15, 1966

3,234,845
APPARATUS FOR OPTICALLY CORRELATING THE ALIGNMENT OF A TRANSPARENCY AND AN OBJECT
Gus Stavis, Briarcliff Manor, N.Y., assignor to General Precision, Inc., a corporation of Delaware
Filed Apr. 22, 1963, Ser. No. 275,478
6 Claims. (Cl. 88—1)

This invention relates to correlators, that is, to apparatus for determining the misalignment between two superposed objects or images thereof.

In the class of correlators of present interest, the first object may be an actual physical objects or an opaque photograph thereof, the reflective characteristics of which vary in any manner over its surface. Alternatively, the first object may be a variable density transparency illuminated by a diffuse source. The second object is a variable density positive transparency of the first to a reduced scale positioned parallel to the first a substantial distance away. The light pattern reflected from or transmitted through the first object passes through the second to a detecting plane parallel to both objects. Provided that the distances from the detecting plane to the two objects are selected properly with due regard for scale factor and provided that the two objects are properly aligned in both rotation and translation, a spot of light will appear on the detecting plane due to the similarity or correlation between the objects. Translation of the second object (the variable density transparency) simply translates the correlation spot; rotation away from the optimum position causes the correlation spot to diffuse, finally disappearing into the background illumination.

Assume for a moment that the second object (the transparency) be removed, leaving an aperture of the same size. If this aperture is very small compared to the area of the first object it will act as a "pinhole" causing an image of the first object to appear on the detecting plane. When the transparency is reinserted, the amplitude of the light will vary over the area of the detecting plane because of the image-forming effect of the small aperture and also because of the above mentioned correlation between the two objects. If the scale factor is small, for example if the transparency is one-half the size of the first object, the aperture is so large that the image-forming effect is insignificant. But if the first object is the terrain beneath an aircraft and the second is a small aerial photograph of the same terrain, the image-forming effect is very real and very troublesome. The correlation spot may be superimposed on either a light or a dark portion of the image and its amplitude may be no greater or may even be less than that of one or more bright portions of the image. Under these conditions the detection of the correlation spot becomes difficult.

One arrangement for distinguishing the correlation spot from other bright areas, such as those due to the image-forming effect and collectively called background illumination, is described in the co-pending application of George R. Gamertsfelder, Lester I. Goldfischer, John K. McKendry, and Richard M. Vesper, Serial No. 275,475 filed April 22, 1963 for Image Correlator, which application is assigned to the same assignee as is the instant application. Briefly, that application describes a system in which the second object, the reference transparency, is oscillated continuously about the optical axis. Thus the correlation spot alternately merges into the background and reappears while the background illumination remains substantially constant. A radiant energy sensor in the detecting plane therefore generates a signal having an alternating component which is recovered and examined to provide an indication of the correlation spot free from interference due to background illumination.

The arrangement described in the above-mentioned application, Serial No. 275,475, is very effective and quite satisfactory but is subject to the mechanical difficulties inherent in maintaining the transparency in continuous oscillation. A general object of the present invention is to obtain the advantages of the system described in application Serial No. 275,475 without requiring oscillatory motion.

Another object is to provide an optical correlator for determining the misalignment between two similar objects or images thereof.

Another object is to provide apparatus for obtaining signals equivalent to those obtained when using an oscillating transparency yet without employing oscillatory motion.

Briefly stated, the invention employs sequential sampling of discrete angular positions instead of continuous sampling. More particularly, a special composite transparency is prepared consisting of a number of segments of the original transparency oriented at different angles. This composite transparency remains fixed while a segmented shutter is rotated continuously in front of it. The effect is that of successively comparing the first object with variously oriented segments of the transparency with the result that the photoelectric sensor generates signals corresponding to discrete portion of the excursion of a continuously oscillating transparency.

Figure 2:
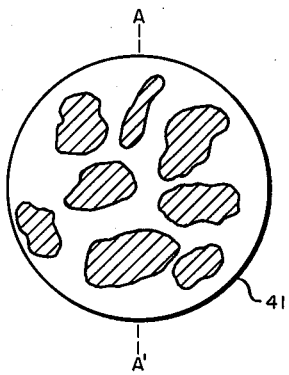
Figure 3:
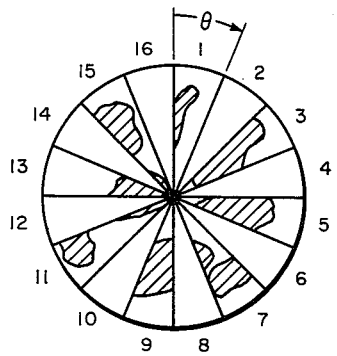
Figure 4:
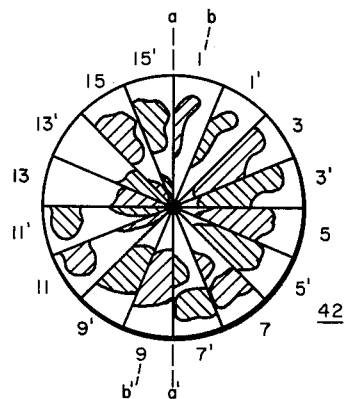
Figure 5:
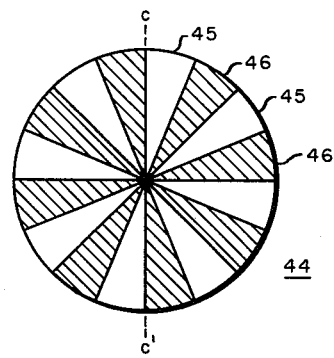
Figure 8:
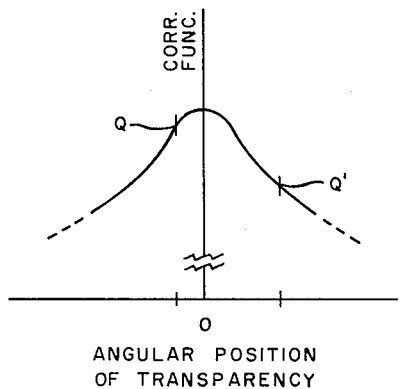
Figure 9:
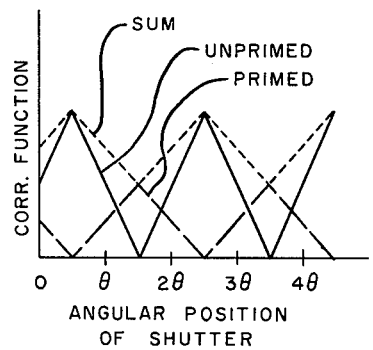
Figure 10:
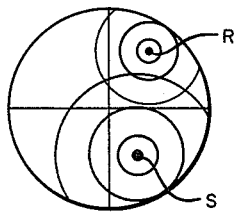
Figure 11:
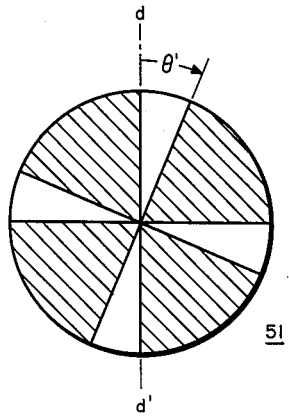
Figure 12:
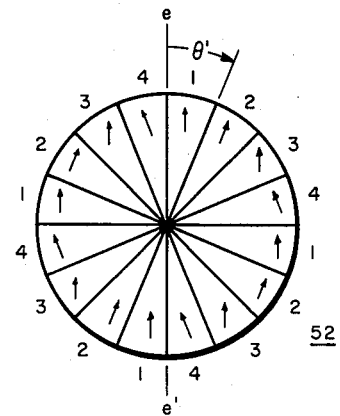

For a clearer understanding of the invention reference may be made to the following detailed description and the accompanying drawing, in which:

FIGURE 1 is a schematic showing of one setting of the invention;
FIGURE 2 is a schematic showing of a variable density transparency;
FIGURE 3 illustrates one step in the preparation of a composite transparency;
FIGURE 4 shows a composite transparency;
FIGURE 5 depicts a segmented shutter;
FIGURES 6, 7, 8 and 9 are graphs useful in explaining the invention;
FIGURE 10 depicts the position of two bright spots on a radiant energy sensor;
FIGURE 11 shows another shutter;
FIGURE 12 is a schematic showing of another composite transparency;
FIGURES 13, 14, 15 and 16 are additional graphs useful in explaining the invention;
FIGURE 17 is a mechanical schematic diagram showing the arrangement of the parts of the invention; and
FIGURE 18 is a schematic block diagram of the electrical connections.

Referring first to FIGURE 1, there is shown in profile the terrain 31 beneath an aircraft. The terrain 31 may be illuminated by a natural or artificial source of electromagnetic wave energy in the infrared, the visible, the ultraviolet or the radio frequency range of the spectrum. For present purposes it will be assumed that illumination is by natural sources such as daylight. The terrain 31 will in general consist of various features which reflect various amounts of the incident light.

Above the terrain 31 is a variable density transparency 32 mounted in an aperture in a frame 33. Just above the transparency 32 (although it could be just below) is a shutter 34 mounted for rotation about a vertical axis 35. Above the transparency 32 and the shutter 34 is a detecting plane 36, the central portion of which is occupied by a radiant energy sensor 37. It is assumed for illustrative purposes that the transparency 32, the frame 33, the shutter 34, the detecting plane 36 and the sensor 37 are all mounted on an aircraft.

The sensor 37 is preferably one which generates three voltages in response to incident light, the first indicative of the total amount of light reaching the sensitive area and the other two indicative of the position on the sensor of the center of illumination. One sensor which has been found to be satisfactory is designated a Radiation Tracking Transducer, type XY–20B RTT, manufactured by Micro Systems, Inc., San Gabriel, California. This sensor generates three unidirectional voltages, the first indicating by its amplitude the total amount of light falling upon the sensitive area of the device and the other two having amplitudes and polarities indicative of the power and position, in orthogonal directions, of the centroid of the incident light and both of the latter two being zero when the centroid is at the center of the sensitive area.

The apparatus described in application Serial No. 275,475 is in general similar to that shown in FIGURE 1 except there is no shutter. The transparency 32 is a positive photograph of the terrain and is oscillated continuously about the axis 35. The sensor 37 generates signals having alternating current components which components are recovered and used to adjust the mean angular position of the transparency 32 and the translational position of the sensor 37 in the detecting plane 36.

In the present invention, the transparency 32 consists of segments of an aerial photograph arranged as will be fully explained. This composite transparency 32 is also mounted to be rotatable about the axis 35, but in operation, rotation is limited to that which is necessary to adjust the angular position. The shutter 34 also comprises a number of segments and is rotated continuously about the axis 35. The signals generated by the sensor 37 are used to adjust the angular position of the transparency 32 and the translational position of the sensor 37.

FIGURE 2 shows a typical transparency 41 in which the various features of the terrain are shown schematically by arbitrarily shaped light and dark areas. This transparency is dissected into a number of radial segments 1–16 each of angular width $\theta$. The even-numbered segments are discarded, leaving only odd-numbered segments as shown in FIGURE 3. A second identical dissected transparency is made and combined with the first so that the odd-numbered segments of the second occupy the spaces left by the even-numbered segments of the first. The composite transparency 42 thereby formed is shown in FIGURE 4, wherein the unprimed and primed segment numbers refer to the first and second dissected transparencies respectively. This composite transparency 42 is inserted in place of the transparency 32 in the apparatus of FIGURE 1.

FIGURE 5 shows schematically a segmented shutter 44 having alternately arranged transparent and opaque segments 45 and 46, respectively. The shutter 44 is inserted in the apparatus of FIGURE 1 in place of the shutter 34.

With the composite transparency 42 and the shutter 44 in place, rotation of the shutter 44 causes an alternating presentation of all of the primed and all of the unprimed segments. This amounts to comparing the primary information (the terrain 31) alternately with the primed and unprimed segments. Assuming for a moment that FIGURE 2 represents the terrain 31, let a reference diameter be designated A–A'. Let a similar reference diameter, $a$–$a'$, be designated on the composite transparency 42 of FIGURE 4. If the reference transparency 42 be oriented so that the diameter $a$–$a'$ is aligned with the diameter A–A', then there will be maximum correlation between the terrain 31 and the unprimed segments. If the transparency 42 be rotated counterclockwise through an angle $\theta$ so that the line between segments 1 and 1' is aligned with the diameter A–A', there will be maximum correlation between the terrain and the primed segments. If the transparency is positioned so that the diameter $b$–$b'$ is aligned with the diameter A–A', the correlation between the terrain and the primed and unprimed segments will be the same.

Figure 6:
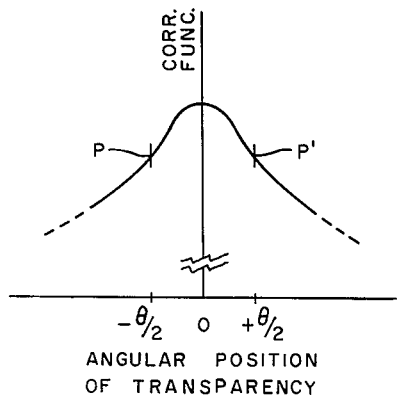

Neglecting for a moment the effect of the shutter, FIGURE 6 shows how the amplitude of the correlation function varies with the angular position of a reference transparency with respect to the terrain. With optimum alignment, the correlation function is a maximum, decreasing with rotation to either side of the optimum position. With the transparency 42 positioned with the diameter $b$–$b'$ aligned with the diameter A–A', the correlation function due to the unprimed segments has the amplitude indicated by the point P while the amplitude of the correlation function due to the primed segments has an equal amplitude as indicated by the point P'.

Figure 7:
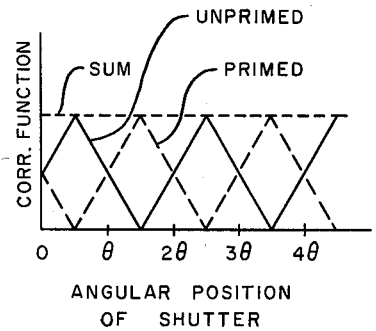

Considering now the effect of the shutter 44, let the diameter $c$–$c'$ of FIGURE 5 be established as a reference position and consider the shutter to be at its reference or zero position when the diameter $c$–$c'$ is aligned with the diameter A–A' of the terrain. Assume that the transparency 42 is positioned as discussed above with its diameter $b$–$b'$ aligned with the diameter A–A' of the terrain. With the shutter 44 in its zero position, the primed and unprimed segments of the transparency 42 are presented equally to the sensor 37 and the amplitude of the correlation function due to each is equal. If the shutter 44 now be rotated, the contributions of the primed and unprimed segments will vary as shown in FIGURE 7, wherein the solid lines and the dashed lines represent the contributions of the unprimed and primed segments, respectively. If the angular velocity of the shutter is constant, the transition is linear as shown and the sum of the amplitudes is constant as indicated by the dotted line.

If the transparency 42 is displaced so that its reference diameter $b$–$b'$ is not aligned with the diameter A–A', the maximum amplitudes of the correlation function due to the primed and unprimed segments are no longer equal. FIGURE 8 shows a typical condition wherein the maximum amplitudes due to the unprimed and primed segments are indicated at Q and Q' respectively. The contributions of the two groups of segments to the total correlation function as seen by the sensor 37 is shown in FIGURE 9 as a function of the angular position of the shutter 44. The sum is no longer constant but has an alternating component the phase and amplitude of which are indicative of the direction and extent of the angular deviation of the transparency 42 from the optimum alignment position.

The above described arrangement is analogous to that of an oscillating transparency in which the correlation function is sampled at two discrete points, namely, at the two extreme positions. This arrangement provides azimuth sensing since it would be possible to synchronously detect the alternating sum component depicted in FIGURE 9 and to derive an error signal which could be used to adjust the transparency 42 to the angular position of optimum alignment. However, this arrangement fails to put a "signature" on the correlation function because the function is constant at the aligned position. The practical significance of this shortcoming is seen when an attempt is made to adjust the sensor 37 in translation so as to place the correlation spot at its center.

Assuming that the transparency 42 has been aligned in azimuth, the contributions of the primed and unprimed segments will be equal, as depicted in FIGURE 6, and their sum will be constant when the shutter 44 rotates, as depicted in FIGURE 7. The correlation spot will not, in general, be at the center of the sensor 37 but may be at some point R, as shown in FIGURE 10. There may also be another bright spot such as S, due not to correlation but to background illumination. Since the correlation spot is constant in amplitude, it cannot be distinguished from the background and the centroid of illumination will not be at point R but at some point between the points R and S. Obviously the sensor 37 cannot be adjusted in translation to place the spot R at its center. This difficulty may be overcome by an extension of the foregoing principles, as illustrated in FIGURES 11–16.

The arrangement about to be described simulates the effect of an oscillating transparency system in which the correlation function is sampled not at two points, as in the previously described arrangement, but at four points; namely (1) the center, (2) the first extreme position (3) the center, and (4) the opposite extreme position, whereupon the cycle is repeated. This arrangement requires a quadruply composite transparency.

FIGURE 11 shows a circular shutter 51 having four evenly spaced segments of width $\theta'$ (twenty-two and one half degrees) transparent and the remainder opaque. This shutter is used both in the apparatus and for generating the transparency. A suitable transparency may be generated in four steps. For this purpose, a reference diameter $d$–$d'$ is designated on the shutter, and the following four steps are executed.

(1) The shutter 51 of FIGURE 11 is placed over the transparency 41 of FIGURE 2 with the diameters A–A' and $d$–$d'$ aligned and the transparency 41 is photographed through the shutter.

(2) The transparency is rotated clockwise through $+\theta°$ and the shutter is also rotated the same amount and the film re-exposed.

(3) The diameter A–A' is rotated back to its zero position, the shutter diameter $d$–$d'$ is rotated to the $+2\theta$ position and the film again exposed.

(4) The diameter A–A' is now rotated to the $-\theta$ position, the shutter diameter $d$–$d'$ is rotated to the $+3\theta$ position and the film again exposed.

Thus there is created a new transparency 52 as shown in FIGURE 12 having four kinds of information as indicated by the segments 1, 2, 3 and 4. The distinguishing feature of these segments is their angular orientation with respect to the reference diameter $e$–$e'$. Segment 1 is at zero degrees; segment 2 at $+\theta°$; segment 3 at zero degrees; and segment 4 at $-\theta°$. The shutter 51 and the transparency 52 are installed in the apparatus of FIGURE 1. As the shutter rotates, the sensor 37 is presented with area information having angular step motion analogous to sampling discrete points as a transparency is rotated.

Figure 13:
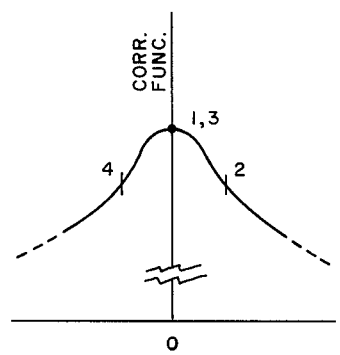

The amplitude of the correlation function corresponding to the presentation of the various segments is shown in FIGURE 13 for the case of optimum alignment between the transparency 52 and the terrain 31. When segment 1 is presented, the function is a maximum; when segment 2 is presented, there is a misalignment of $\theta°$ and the amplitude of the function is less; when segment 3 is presented the function is again a maximum; and when segment 4 is presented the amplitude is again reduced.

Figure 14:
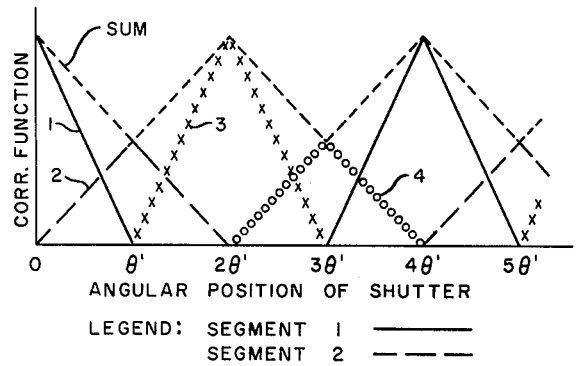

FIGURE 14 shows the contributions of the various segments to the correlation function and their sum as a function of shutter position, for the condition of optimum alignment. It is apparent that the total function (the sum) has an alternating component the frequency of which is eight times the rotational frequency of the shutter. Denoting the rotational frequency of the shutter by $f$, the above-mentioned component has a frequency of $8f$.

Figure 15:
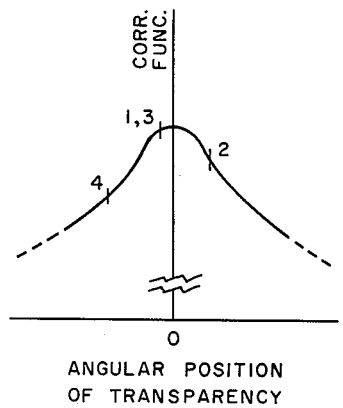

FIGURE 15 is similar to FIGURE 13 but illustrates the situation when the transparency 52 and the terrain 31 are misaligned. As shown, the presentation of segments 1 and 3 yield the same amplitude of the correlation function which amplitude is less than the maximum. Presentation of segments 2 and 4 now produce different amplitudes of the correlation function.

Figure 16:
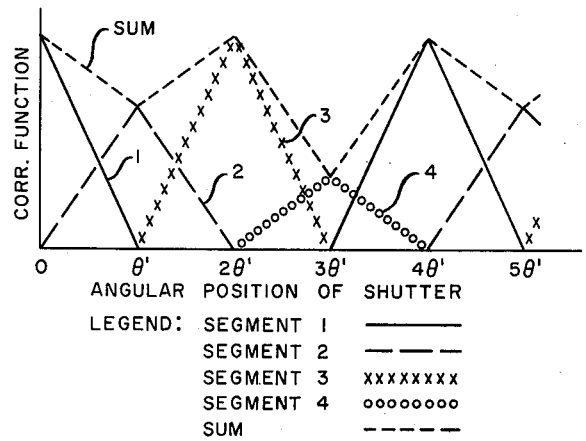
Figure 17:
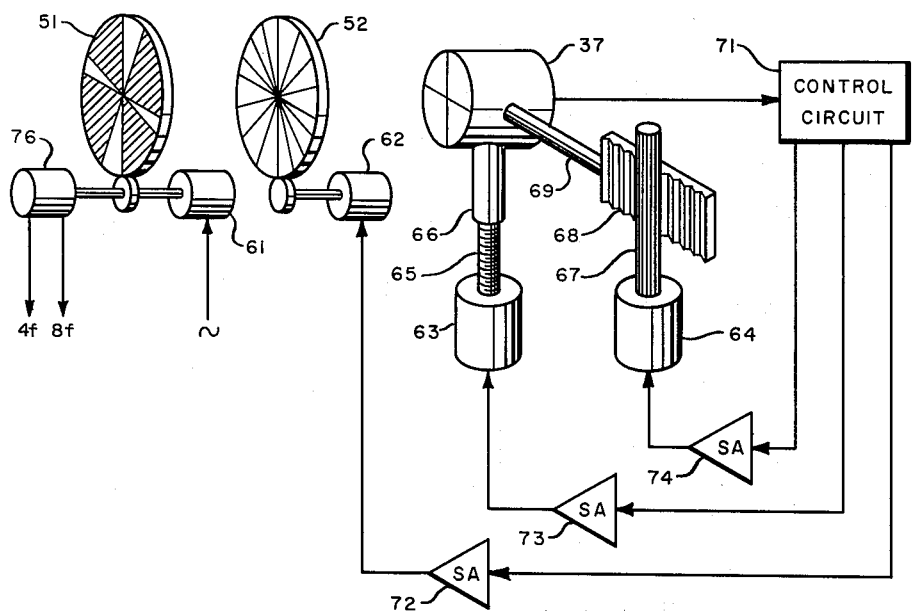

FIGURE 16 shows the contributions of the segments and their sum as a function of shutter position for the misaligned case. It is apparent that the sum now has an alternating component at four times the shutter rotation frequency, or at $4f$, in addition to the component at $8f$. Obviously misalignment in the opposite direction would cause the generation of a component of like frequency but of opposite phase.

It is to be noted that the number of segments into which the transparency is divided may be more than four, for example six or eight, depending upon the fineness with which the picture may need to be divided to assure adequate sampling of the whole picture despite statistical variations over the area.

It is also to be noted that the angle through which the transparency is rotated when the composite transparency is formed may be chosen independently of the segment width and shutter aperture angle. Thus the effective angular excursion may be selected for each transparency as an optimum choice based on the azimuth correlation function for that transparency.

It is apparent that with the above-described arrangement, the correlation function always has a "signature," that is, an alternating component by which it may be distinguished from the background illumination. Actually there are always present not only the previously mentioned components at frequencies of $4f$ and $8f$ but also components at higher frequencies. However, the components at $4f$ and $8f$ are of principal interest for present purposes. The presence of the component at $4f$ indicates by its phase and magnitude the direction and extent of rotational misalignment. The component at $8f$ can be detected and used to position the sensor in translation.

FIGURE 17 depicts schematically the mechanical arrangement of a correlator utilizing the principles of the invention. There is shown the shutter 51 rotated at a substantially constant speed by an electric motor 61. Adjacent to the shutter 51 is the composite transparency 52 which is rotatable in either direction by a motor 62 in response to control signals. Approximately aligned with the shutter 51 and transparency 52 is the radiant energy sensor 37. It is assumed that the primary information (such as the terrain 31 of FIGURE 1) is located to the left of FIGURE 17.

The sensor 37 is mounted to be movable in two orthogonal directions by means of the motors 63 and 64. The motor 63 rotates a threaded lead screw 65 which cooperates with a rod 66 having corresponding internal threads and which in turn is fastened to the body of the sensor 37. The motor 64 rotates an elongated pinion 67 which cooperates with a rack 68 which is connected to the sensor 37 by a rod 69. It is assumed that the motor 63 is mounted to be slidable in the direction of movement of the rack 68. The arrangement illustrated is intended to be merely a schematic showing of a device for positioning the sensor 37 in orthogonal directions in the detecting plane and any suitable system could be used.

The signals generated by the sensor 37 are passed to a control circuit 71 which will be fully described. The circuit derives three error signals. The first is indicative of rotational misalignment of the transparency 52 and is led to a servo amplifier 72 which controls the motor 62. The other two error signals are indicative of translational misalignment of the sensor 37 and are passed to servo amplifiers 73 and 74 which control the motors 63 and 64 respectively.

Also shown in FIGURE 17 is a reference signal generator 76 which is rotated in synchronism with the shutter 51 and which generates two alternating current voltages, one having a frequency of $4f$ and the other having a frequency of $8f$. Various kinds of signal generators may be used, perhaps the simplest being the well-known light commutator in which a cylinder having alternate transparent and opaque sections is revolved about a light source so that a stationary photoelectric cell generates an alternating voltage the frequency of which depends upon the number of segments and the speed of rotation. The two signals from the generator 76 are used as references for phase detectors, as will be more fully explained.

Referring now to FIGURE 18, the radiant energy sensor 37 is shown schematically as comprising two terminal groupings 37a and 37b. The grouping 37a includes terminals 81 and 82 between which is generated a unidirectional voltage the polarity and magnitude of which are indicative of the direction and extent of the departure of the centroid of incident light from the horizontal or $x$ axis. As previously explained, that portion of the light representing the correlation function includes an alternating component and in order to separate this component from the background, the terminals 81 and 82 are connected to the input of an amplifier 83 which amplifies only those frequencies at or near 8f (eight times the rotational frequency of the shutter). The output of this amplifier is an alternating voltage representing by its phase and amplitude the direction and extent of the departure of the centroid of the correlation spot from the x axis. This alternating voltage is applied to a synchronous detector circuit 84.

It will be recalled that the reference signal generator 76 generates two alternating voltages having frequencies of 4f and 8f, respectively. These voltages are applied to amplifiers 85 and 86 respectively to obtain reference voltages of suitable magnitude to serve as keying voltages for the synchronous detectors. The voltage of frequency 8f from the amplifier 86 is applied to the synchronous detector 84. The output of the detector circuit 84 is a unidirectional error signal of reversible polarity indicative of the y coordinate misalignment of the senor 37. This error signal is applied to the previously mentioned servo amplifier 73 which controls the motor 63 so as to position the senor 37 in one coordinate.

The terminal grouping 37a also includes two terminals 91 and 92 between which is generated a voltage indicative of translational misalignment with respect to the y axis. This voltage is processed by a chain of components similar to those above described including a tuned amplifier 93 and a synchronous detector 94 keyed by the 8f reference voltage. The output of the detector circuit 94 is applied to the servo amplifier 74 which controls the motor 64.

The terminal grouping 37b includes four terminals 101, 102, 103 and 104 connected to a junction 105 through individual resistors 106, 107, 108 and 109. An additional terminal 111 is also connected to the junction 105 through a resistor 112. The junction 105 and the terminal 111 constitute the so-called "area" output of the sensor 37, since the voltage developed between the junction 105 and the terminal 111 is a unidirectional voltage the magnitude of which is indicative of the total amount of radiant energy falling upon the entire sensitive area of the device. As previously explained, the correlation portion of this energy has many alternating components, those of principal interest being at frequencies of 4f and 8f.

The voltage between the junction 105 and the terminal 111 is applied to a broadband amplifier 114 to raise the level of the signal. The output of the amplifier 114 is applied to a tuned amplifier 115 which amplifies only those frequencies at or near 4f, rejecting other frequencies. The output of the amplifier 115 is, accordingly, an alternating voltage the phase and magnitude of which are indicative of the direction and amount of the rotational misalignment of the transparency 52 (FIGURES 12 and 17). This alternating voltage is applied to a synchronous detector circuit 116 which is keyed by the 4f reference voltage from the amplifier 85 so as to derive a unidirectional voltage the polarity and amplitude of which represent rotational misalignment. This voltage is applied to the servo amplifier 72 which controls the motor 62 so as to correct the misalignment.

The amplitude of that portion of the correlation signal having a frequency of 8f which appears across the junction 105 and the terminal 111 does not vary greatly with small changes in azimuth adjustment of the transparency 52, but does vary with the level of illumination. Accordingly this component is suitable for automatic gain control. To this end, the output of the amplifier 114 is led to a tuned amplifier 118 which amplifies only those frequencies at and near 8f. The amplified signal is applied to a detecting and smoothing circuit 119 which develops a gain control voltage. This voltage is applied to the amplifiers 83, 93 and 115 to stabilize their output levels.

The mode of operation is believed to be apparent from the foregoing description. However, a brief summary is given. The apparatus is arranged as shown in FIGURE 17, with the shutter 51 rotating at a substantially constant speed. It will be assumed that there is both azimuth misalignment of the transparency 52 and translational misalignment of the sensor 37. The "area" output of the sensor 37, appearing across the junction 105 and the terminal 111, has a component at a frequency of 4f, as indicated by the "sum" curve of FIGURE 16. This component is recovered by the above described apparatus including the synchronous detector 116 and used to adjust the angular position of the transparency 52 until the 4f component vanishes at which time the correlation function is a maximum.

The voltages appearing at the terminals 81, 82 and 91, 92, indicative of the position of the illumination on the sensor 37, have components at the 8f frequency, as indicated by the "sum" curve of FIGURE 14. These components are recovered by the apparatus described in connection with FIGURE 18, including the synchronous detectors 84 and 94, and are used to adjust the translational position of the sensor 37 until these components vanish, at which time the center of the correlation spot is at the center of the sensor 37.

The apparatus of the present invention is intended to be used with suitable apparatus for measuring the angular position of the transparency 52 and the displacement of the sensor 37 with respect to appropriate references. However, since the details of such apparatus are well known, it has been deemed unnecessary to burden the present disclosure with a description thereof.

Although a preferred embodiment of the invention has been described for illustrative purposes, many modifications will occur to those skilled in the art. It is therefore desired that the protection afforded by Letters Patent be limited only by the true scope of the appended claims.

What is claimed is:
1. A correlator, comprising,
an illuminated body,
a variable density transparency,
said transparency comprising a plurality of variable density representations of portions of said body, said representations being oriented at various angles with respect to said body,
a radiant energy sensing means positioned to receive radiant energy transmitted through said transparency from said body,
and means for masking different ones of said representations successively.
2. A correlator, comprising,
an object emanating radiant energy the intensity of which varies over its surface,
a composite variable density transparency,
said composite transparency comprising a plurality of variable density representations of portions of said object each reduced to the same scale,
individual representations being angularly positioned at various angles with respect to said object,
a radiant energy sensor positioned to receive radiant energy transmitted from said object through said composite transparency,
and means for successively exposing said sensor to energy transmitted through different ones of said individual representations while masking others of said representations.
3. A correlator, comprising,
a body emanating radiant energy the intensity of which varies over its surface,
a variable density composite transparency,
said transparency comprising a plurality of equal sized segments,
each segment being a representation of a portion of said body to a reduced scale,
said segments being fitted together to form said composite transparency, the information content of said segments being angularly positioned at various angles with respect to said body, a radiant energy sensor positioned to receive energy transmitted from said body through said composite transparency, whereby a spot of energy indicative of the correlation between said body and said transparency appears on said sensor, a shutter of substantially the same size as said transparency positioned closely adjacent thereto, said shutter having a transparent portion the same size and shape as one of said segments, the remainder of said shutter being opaque, and means for rotating said shutter at a substantially constant speed, whereby said spot of energy indicative of said correlation varies in amplitude as said shutter rotates.

4. A correlator, comprising, a body emanating radiant energy the intensity of which varies over its surface, a variable density composite transparency comprising a plurality of segments, each of said segments being a representation of a portion of said body, the information content of said segments being oriented at various angles with respect to said body, a radiant energy sensor positioned to receive energy transmitted from said body through said composite transparency, whereby a spot of energy indicative of the correlation between said body and said transparency appears on said sensor, said sensor being for generating a first signal indicative of the total illumination on said sensor and for generating second and third signals indicative of the position on said sensor in orthogonal coordinates of the centroid of illumination, a rotating shutter positioned closely adjacent to said transparency having a transparent portion substantially the same size and shape as one of said segments, the remainder of said shutter being opaque, whereby said signals generated by said sensor have alternating components, and means controlled by said alternating components of said signals for adjusting the angular position of said transparency and for adjusting the translation position of said sensor.

5. A correlator, comprising, a body illuminated with radiant energy, a composite transparency having varying degrees of opacity for said radiant energy, said transparency comprising a plurality of groups of segments each group being composed of a plurality of segments of the same size and shape, the segments forming each group being fitted together in contiguous relation and the groups of segments being fitted together to form a composite transparency, each segment being representative of a portion of said body, the information content of selected segments in each group being angularly displaced in opposite directions with respect to that of the remainder of the segments in each group, a radiant energy sensor positioned to receive energy transmitted from said body through said composite transparency, a shutter positioned closely adjacent said transparency having a plurality of transparent portions equal in number to the number of said groups, each transparent portion being of the same size and shape as one of said segments, said shutter transparent portions being equally angularly displaced with respect to each other and the remainder of said shutter being opaque, and means for rotating said shutter continuously whereby the radiant energy reaching said sensor is effectively a successive comparison of the features of said body with discrete angular orientations of representations thereof.

6. A correlator, comprising, a body illuminated with radiant energy, a composite transparency having varying degrees of opacity for said radiant energy, said transparency comprising four groups of segments each group being composed of first, second, third, and fourth segments all of the same size and shape, the segments of each group being fitted together in contiguous relation and the groups of segments being fitted together to form a composite transparency, each segment being a representation of a portion of said body, the information content of said second and fourth segments being angularly displaced in opposite directions with respect to that of the first and second segments of each group, a radiant energy sensor positioned to receive energy transmitted from said body through said composite transparency, a shutter positioned closely adjacent said transparency having four transparent portions, each transparent portion being of the same size and shape as one of said segments, said shutter transparent portions being equally angularly displaced with respect to each other and the remainder of said shutter being opaque, and means for rotating said shutter continuously whereby the radiant energy reaching said sensor is effectively a successive comparison of the features of said body with discrete angular orientations of representations thereof.

References Cited by the Examiner

UNITED STATES PATENTS

| | | | |
|---|---|---|---|
| 2,884,540 | 4/1959 | Schockley | 244—14 X |
| 2,937,283 | 5/1960 | Oliver | 88—14 |
| 2,985,366 | 5/1961 | Scarrott | 250—237 |
| 3,125,683 | 3/1964 | Stewart et al. | 250—219 |

JEWELL H. PEDERSEN, *Primary Examiner.*

SAMUEL FEINBERG, *Examiner.*